United States Patent [19]
Gailey et al.

[11] Patent Number: 5,766,730
[45] Date of Patent: Jun. 16, 1998

[54] STRAND MATERIALS

[75] Inventors: Robert McNaught Gailey, Paisley; Stanley Oglesby, Newton Mearns, both of Great Britain

[73] Assignee: Coats Viyella PLC, London, England

[21] Appl. No.: 605,109

[22] PCT Filed: Aug. 26, 1994

[86] PCT No.: PCT/GB94/01873

§ 371 Date: May 8, 1996

§ 102(e) Date: May 8, 1996

[87] PCT Pub. No.: WO95/06558

PCT Pub. Date: Mar. 9, 1995

[30] Foreign Application Priority Data

Sep. 1, 1993 [GB] United Kingdom .................. 9318133

[51] Int. Cl.$^6$ ........................................ B32B 3/26
[52] U.S. Cl. .................... 428/174; 156/494; 156/229; 264/210.2
[58] Field of Search ................... 428/98, 174, 230, 428/231, 397; 156/494, 496, 229; 264/210.2, 290.2

[56] References Cited

U.S. PATENT DOCUMENTS

| 3,416,991 | 12/1968 | Yoshimura | 428/397 |
| 4,082,598 | 4/1978 | Katagi | 156/463 |
| 4,167,234 | 9/1979 | Gordon et al. | 220/359 |

FOREIGN PATENT DOCUMENTS

WO 93/11931  6/1993  WIPO.

*Primary Examiner*—Alexander Thomas
*Attorney, Agent, or Firm*—Bell Seltzer Intellectual Property Law Group of Alston & Bird LLP

[57] ABSTRACT

There is disclosed a method and apparatus for making strand material comprising drawing a laminar material having a first layer of drawable material and a second layer of elastically extensible material so that the first layer extends inelastically while the second layer extends elastically so that the drawn material tends to curl into a coiled strand configuration.

40 Claims, 3 Drawing Sheets

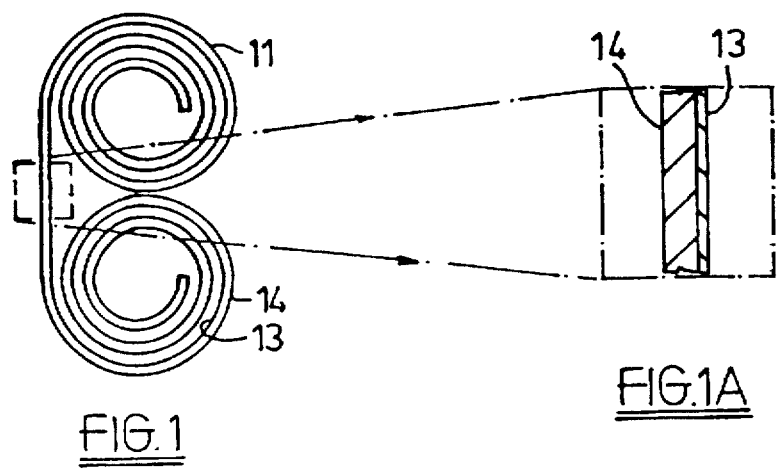
FIG.1    FIG.1A
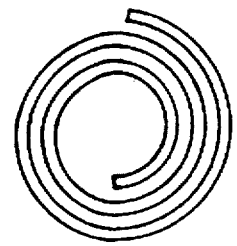
FIG.2
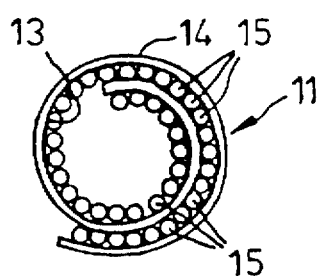
FIG.3
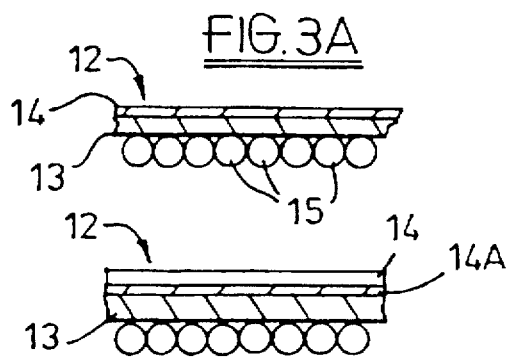
FIG.3A
FIG.3B
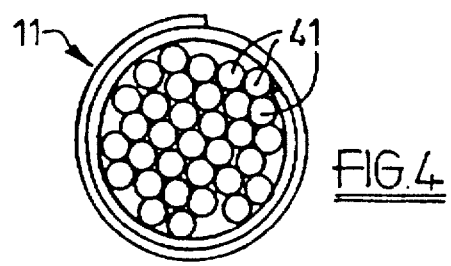
FIG.4

STRAND MATERIALS

BACKGROUND OF THE INVENTION

This invention relates to strand material.

Strand material is usually made from synthetic materials by spinning filaments from a spinnerette and performing various operations on the filaments, the first of which usually involves drawing the filaments. Threads and yarns suitable for clothing and finer household textiles, for weaving, knitting and sewing as well as for making non-woven fabrics, are made from such filaments.

Strand material has been made principally, however, for coarser material than the filamentary materials aforementioned, by slitting and/or fibrillating tape or sheet plastics materials. Attempts to produce yarns and threads from film materials, while promising much from the point of view of costs of production and usability of less expensive polymer materials, have not in practice yielded acceptable products of the fineness required for weaving, knitting and sewing.

GB 1 091 588 describes a process for making "elongated articles", referred to as cords and said to be suitable for use in wrappers, handicrafts, and ornaments and as tire cords, by stretching a composite type of 0.5–50 mm in width consisting of a stretchable base layer and a lamina or coated layer thereon which is chemically or physically different from the base layer and then longitudinally stretching the tape so it becomes curled or convoluted along each side marginal position. The films, whether as base layer or laminated or coated layer, must be non-orientated or partially orientated thin films capable of being stretched in at least one direction.

The curled or convoluted configuration can be made to contain linear or core articles such as monofilament, multifilament, spun yarn, thread, cord and metal articles such as wire, by feeding in such articles as the tape is stretched to form the convolutions.

U.S. Pat. No. 3,967,038 discloses the production of untwisted synthetic resin string comprising two rolled portions each spiral in cross section and formed by inwardly rolling toward each other the opposite side edges of a strip of thermoplastic resin film stretched at least longitudinally thereof.

Despite the fact that these patents are already time-expired, their products have not apparently appeared as articles of commerce.

WO 93/11931 covers essentially the same ground as GB-1 091 588, though, surprisingly, written without knowledge of GB-1 091 588. In the course of experimental work aimed at producing commercial products on the basis of the disclosure of WO 93/11931, it was established that the teachings of WO 93/11931 and of GB-1 091 588 and U.S. Pat. No. 3,967,038 lack an essential element for the production of stable, permanently coiled strand material that will find utility in a wide variety of areas that can be as demanding even as sewing thread. The present invention includes the essential element aforementioned.

SUMMARY OF THE INVENTION

The invention comprises a method for making strand material comprising drawing a laminar material having a first layer of drawable material and a second layer of elastically extensible material so that the first layer extends inelastically while the second layer extends elastically so that the drawn material tends to curl into a coiled strand configuration.

The drawable material may be drawn until it is fully drawn, and may be overdrawn—by "overdrawn" is meant drawn to a higher draw ratio than the minimum normally sufficient to produce a fully drawn material.

The laminar material may have an associated drawable filament material which may be a filament yarn—which may be drawn with said first layer. Indeed, such filament material may be coated with a drawable polymer coating to form said first layer. On the other hand, the filament material may be coated with an elastomeric material to form said second layer.

At least one of said first and second layers may contain inclusions that modify its behaviour under extension. The second layer may contain compressible or fluid inclusions, such for example as gas bubbles.

The second layer may contain incompressible or solid inclusions such for example as sub-micron size particles eg. of titanium dioxide and/or pigments.

At least one of said first and second layers may have non-uniform thickness across its width, and may increase in thickness from one edge to the other.

The drawing may be effected continuously, and may be effected symmetrically with respect to the laminar material so as to give rise to a tendency to coil inwardly from either edge, in between input and output means defining a draw zone. Drawing may, on the other hand, be effected asymmetrically, with respect to the laminar material so as to give rise to a tendency to coil inwardly into a single spiral cross-section formation in between input and output means defining a draw zone. Such asymmetric effects may also be produced or enhanced by the non-uniform thickness referred to above.

As in earlier publications, the laminar material may be produced by coating a layer of material on a substrate (independently of the incorporation of filament material as referred to above). The second layer may be coated on to a substrate comprising the first layer or vice versa. The second layer may comprise a composite layer having a first component filled with incompressible inclusions or solid and a second component without such inclusions.

The molecules of the second layer may be cross-linked, and may be chemically linked to those of the first layer.

The laminar material may, as in previous publications, comprise a tape, but may comprise a film which is cut into tapes only after drawing, and in any event a film may be cut into tapes continuously with the drawing step.

The laminar material may be made continuously with the drawing step—a substrate may be coated and drawn in a continuous operation.

The invention also comprises apparatus for making strand material comprising a drawing arrangement adapted for drawing a laminar material having a first layer of drawable material and a second layer of elastically extensible material so that the first layer extends inelastically while the second layer extends elastically so that the drawn material tends to curl into a coiled tape and comprising a source of the laminar material, input and output means defining a draw zone for the material and collection means for the drawn material.

The apparatus may comprise coating means adapted to apply a coating to a substrate to produce a laminar material. The coating means may be situated for continuous operation providing said laminar material by coating a substrate en route to said drawing arrangement.

The apparatus may comprise sheet material slitting means, which may operate on laminar material before the drawing means to supply tape material to said drawing means, or after the drawings means to slit drawn material into tapes which have a tendency to curl into coiled strands—because of the stable nature of the material produced according to the invention, the tendency to curl can remain latent even through prolonged storage and manifest itself as a curling or coiling even after the sheet or tape material has been held flat and as soon as it is freed from constraint.

The apparatus may include filament material supply means feeding filament material to be combined in said laminar material and drawn therewith.

The apparatus may also comprise skewing means in the drawing arrangement whereby the laminar material is drawn asymmetrically.

The invention also comprises drawn strand material made by methods or apparatus according to the invention.

A drawn strand material of the invention comprises a laminar material coiled into a spiral form cross-section and having first and second layers the first layer of which is drawn from a drawable material to a normal or above-normal draw ratio, the second layer of which is of a stretched elastomeric material.

The strand material may have a cross-section in the form of a letter "C" the ends of which are curled into tight spiral form, or it may have a single spiral cross-section, the latter being produced by asymmetric cross-section material, by asymmetric drawing or by slitting a double spiral strand.

The strand material may have a particulate or liquid inclusion in the coils of the laminar material.

BRIEF DESCRIPTION OF THE DRAWINGS

Embodiments of strand material, and of apparatus for making the same, and methods of making the same, all according to the invention will now be described with reference to the accompanying drawings, in which:

FIG. 1 is a cross-section of one form of strand material;

FIG. 1A is an enlarged detail of FIG. 1;

FIG. 2 is a cross-section of another form of strand material;

FIG. 3 is a cross-section of another form of strand material;

FIG. 3A is a cross-section of a laminar material from which the strand material of FIG. 3 is made.

FIG. 3B is a cross-section of another laminar material from which the strand materials of FIG. 3 can be made;

FIG. 4 is a cross-section of another form of strand material;

DETAILED DESCRIPTION

Figure 5:
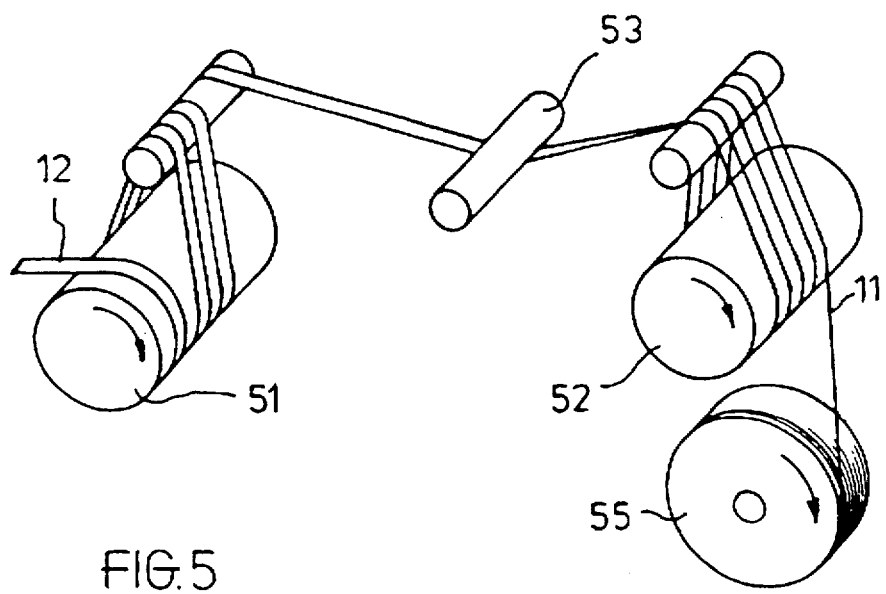
FIG. 5 is a diagrammatic illustration of one arrangement for making strand materials.

The drawings illustrate methods for making strand material 11 comprising drawing a laminar material 12 having a first layer 13 of drawable material and a second layer 14 of elastically extensible material, so that the first layer 13 extends inelastically while the second layer 14 extends elastically so that the drawn material 11 tends to curl into a coiled strand configuration.

In each case, the said second layer 14 is of elastomeric material such for example as polyurethane, polyethylenevinylacetate (EVA), polystyrene butadiene, butadiene, polyacrylonitrile and natural rubber.

Examples of drawable materials which may be used in each case are polyester, polypropylene, nylon-6 and nylon 6.6, but in principle any drawable film-forming polymer is suitable if it can be combined with an elastomer-layer. The film forming materials for purposes of this invention are presented in drawable state, which is to say in an undrawn or partially oriented state such that they are capable of further drawing with inelastic extension before they become fully drawn or in some cases overdrawn. Most drawable polymers have a so-called normal draw ratio (the ratio drawn length/predrawn length) which is the lowest draw ratio at which they become stable and thereafter capable of elastic extension. They are capable, however, of being drawn to higher ratios giving increased length, decreased cross-section and usually increased tenacity—often the tenacity increase is so great that the overdrawn material is stronger than the normally drawn material of the same starting linear density.

In producing strand material according to the invention, a stable coiled product will be produced if the drawable material is fully drawn, whether this is to its normal draw ratio or to a higher draw ratio.

The mechanism of coiling is essentially the same as in the earlier publications referred to, but the combination of a drawable material with an elastically extensible material facilitates the production of coiled products which can be of dimensions useful as yarns and threads for knitting and weaving as well as for sewing. These fine count textile products as well as coarser count strand material such as the cords of GB-1 091 588 and the string of U.S. Pat. No. 3,967,038 can be produced with a tightness of coiling not achieved by the prior art teachings such that the coils can effectively contain filling material such as liquids and powders.

The tightness of coiling is attributable to the width difference which arises when stretching coupled film material of which one component is extending elastically while the other is extending inelastically. The width changes of the elastically extending material will be less than that of the inelastically extending material, and this manifests itself in the coiling, the wider elastically extending material accommodating its greater width by taking up the outside position in the coil.

If the inelastically extended layer is present as a base layer and the elastically extended material as a coating on the base layer, the tensile properties of the composite will be largely determined by the base layer and if this is fully drawn, or overdrawn, the resulting strand will have the sort of tensile properties regarded as normal and desirable for a wide variety of textile purposes.

Because the elastically extended layer is in a stressed condition as a result of the extension it is experiencing a strain which, but for its coupling to the other layer, would cause it to snap back on release of the stress. The strain, however, cannot be relieved in that way, and must be relieved by the action of coiling. Elastomeric materials, which can store a lot of strain energy, when used as the elastically extending material according to the invention, effect the coiling very powerfully, and this has been found, even when the elastomeric material is present as a relatively thin coating, to give tightly coiled strand material capable of holding liquids and powders and not releasing the same except under special circumstances.

Such tightly coiled strands could be produced according to WO 93/11931 when using elastomeric material but without the other aspects of the present invention not disclosed in WO 93/11931 the strands lack the elasticity required and in time would be subject to creep accommodating the strain by length change, permitting the coil to unwind.

Moreover, by appropriate selection of materials—the choice of nylon or polyester for example for the drawable material, and the choice of drawability thereof, i.e. the degree of orientation of the material—and the selection of the draw ratio, i.e. fully drawn or overdrawn, strand material can be made to a range of specifications suitable for a wide range of different end uses.

FIG. 1 illustrates a typical coiled configuration resulting from the drawing of an extensible material 13 which has an elastically extended coating 14. The cross-section is generally "C" shaped with the ends of the "C" tightly coiled.

FIG. 1A is an enlarged detail of an area A of FIG. 1, showing the cross-section of the drawn material, from which it will be seen that the second layer 14 is of substantially less thickness than the first layer. This is typical of coating an elastomer on to a base polyester tape, for example, where the tape may, in its pre-drawn state, be, say, 12 microns thick, and the coating be, say, 2 microns.

Filamentary material may be used in connection with the invention in different ways.

The laminar materials illustrated in FIGS. 3, 3A, 3B and 4 have associated drawable filament material 15 which is drawn with the first layer 13.

In FIGS. 3, 3A and 3B, the filament material 15 comprises a plurality of filaments in the form of a ribbon which has been first coated with a first layer 13 of drawable material which in turn has been coated with a second layer 14 of elastically extendable material. FIG. 3 shows the cross-section after drawing, with the second layer 14 on the outside.

FIG. 3B illustrates a material like FIG. 3A but with an additional layer 14A. This additional layer comprises an elastomeric material with inclusions that modify its behaviour under extension. In fact, the layer 14 of FIG. 3A could contain such inclusions, or the layer 14 of FIG. 3B could be omitted, which would amount to the same thing.

Both compressible and incompressible inclusions can modify the behaviour under extension of an elastomer material such as might be used for the layers 14, 14A. Compressible or fluid inclusions such as air (other other gas) bubbles will result in a greater reduction in width for a given extension, possibly because the bubbles are more readily compressed laterally than would be the elastomer they have displaced. Bubbles can be introduced using a foaming agent in an aqueous elastomeric polymer dispersion or organic solvent solution, or by beating such dispersion or solution prior to coating with it.

Incompressible or solid inclusions such for example as $TiO_2$ or pigment particles, e.g. of sub-micron size will have the opposite effect—they will enhance the difference in width reduction in stretching between the drawable and elastically extendable layers by reducing the reduction in width of the elastic layer.

The inclusion of particles of pigment or $TiO_2$ which is a widely used optical brightener, brings, of course, the usual benefits associated therewith in other textiles. It might be desired to introduce pigment, however, for the sole purpose of colouration, and without affecting the degree of width reduction in stretching—it may be desired to produce a range of coloured threads together with an uncoloured thread which will have the same properties. It is possible, then, to use both the compressible or fluid inclusions and incompressible inclusions so that they cancel out their effects on width change. It may be found also that the inclusion of different amounts of pigment to achieve paler and darker shades, or the use of pigments of different particle sizes, gives rise to different width changes on extension and the use of controlled amounts of compressible or fluid inclusions can normalize the effect for a range of threads.

Whilst emphasis has been laid on the use of inclusions in the elastically extendable second layer, 14, 14A, it is possible to use such inclusions in the inelastically extendable layer 13 where they will have the opposite effects on the coiling properties.

Although inclusion of a solid particle filler in an elastomer ordinarily greatly reduces both the width change on extension and the extensibility, a surprising effect is noted when the elastomer is attached to a drawable film. An elastomer which is, free standing, virtually inextensible on account of the inclusion of a filler, can, when attached to an extensible base film, extend by as much as 350% in length and more. Thus the inclusion of a filler in an elastomer coating of a drawable film or tape can allow the film or tape to be drawn and even overdrawn to virtually any desired degree to yield a longer, stronger and finer textile strand.

Naturally, the inclusion of fluid or particulate matter in one or other or both said first and second layers can be done whether or not filament material is used.

Another way of using filament material is illustrated in FIG. 4, where a filament or even a staple fibre yarn 41 is wrapped up in a coiled sheath of the material 11—which may be produced from a coated tape or from a coated filament assembly as illustrated in FIG. 3.

FIG. 5 illustrates an arrangement for making strand materials according to the invention in which a tape of material 12 comprising first drawable and second elastically extensible layers 13, 14 is stretched between input and output godets 51, 52, the output godet 52 being driven at a higher speed than the input godet 51, to effect a predetermined amount of drawing. Drawn strand 11 from the output godet 52 is collected in a wind-up arrangement 55.

A draw pin 53 is optional; whether to use it or not may depend on the materials of the layers 13, 14, particularly in the choice of drawable material. One or other or both the godets 51, 52 and/or the draw pin 53, if used, may be heated, again depending on the choice of materials, all as will be evident to one skilled in the art of yarn production and processing or as may be readily ascertained by simple experiment using any of the standard equipment available for drawing and otherwise processing textile filament materials.

Figure 7:
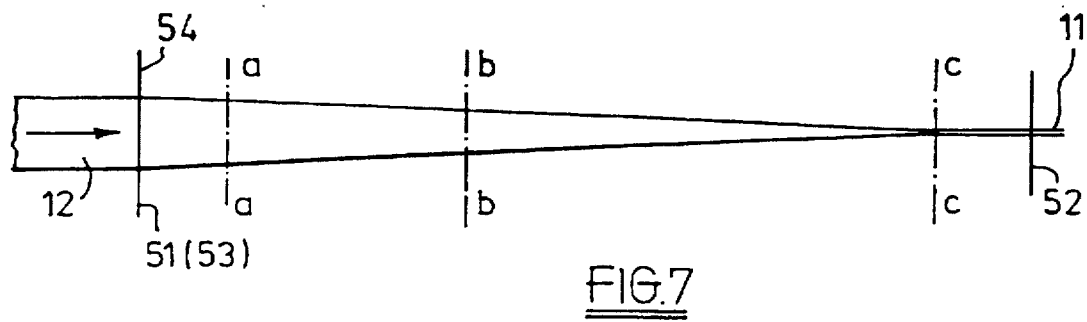
FIG. 7 is a diagrammatic illustration showing one manner of coiling.
Figure 7A:
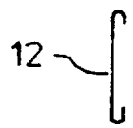
Figure 7B:
Figure 7C:

FIG. 7 is a diagrammatic illustration showing the effect of drawing within the draw zone which is determined by the input and output godets 51, 52, or, if used, the draw pin 53 and output godet 52. Immediately after the draw point 54 the flat tape material 12 begins to curl in at both edges as seen the cross-section at aa. At bb the edges have curled in further and by the time the strand is approaching the output godet 52, at cc, the edge coils have come together so that no further coiling is possible.

Figure 8:
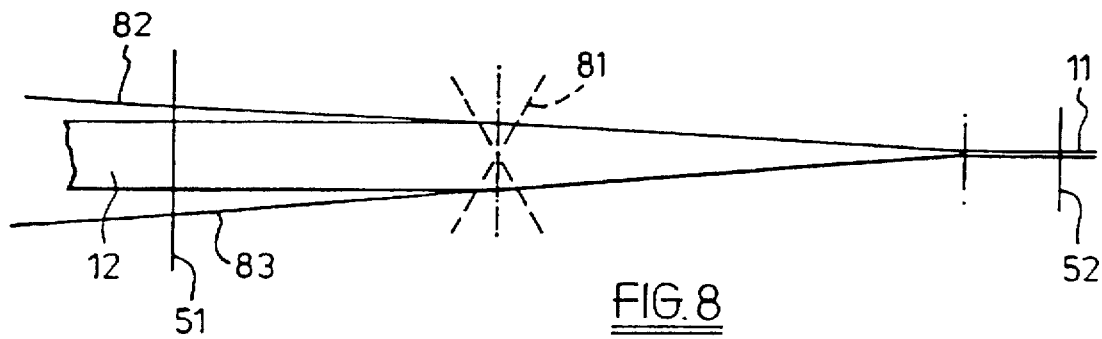
FIG. 8 is a diagrammatic illustration showing insertion of filament material into a tape in a draw zone.

A single coil cross-section as illustrated in FIG. 2 can be achieved by drawing the tape asymetrically, as by angling a draw pin or by running the tape over an angled edge or tension bar 81, in the draw zone, as shown in FIG. 8. Depending, however, on the amount of skew, a double spiral configuration may be produced with unequal coils.

A single coil cross-section can also be produced, of course, by producing first a double coil cross-section and slitting it.

Single coil or differential double coil cross-sections can also be produced by the starting laminar material 12 being itself asymmetric. Asymmetry can be produced by a variable thickness coating, thin on one edge, thick on the other. Either the first or the second layer, or indeed both, may have edge-to-edge thickness gradation, or a gradation in the concentration of inclusions or both.

Even a symmetric material 12 can be induced to form a single coil by feeding in a single filament material—as strand 82 of FIG. 8—somewhat from one side, or, by feeding two such materials, 82, 83 at different angles or under different tensions from opposite sides, asymmetric coil structures can be produced.

Figure 6:
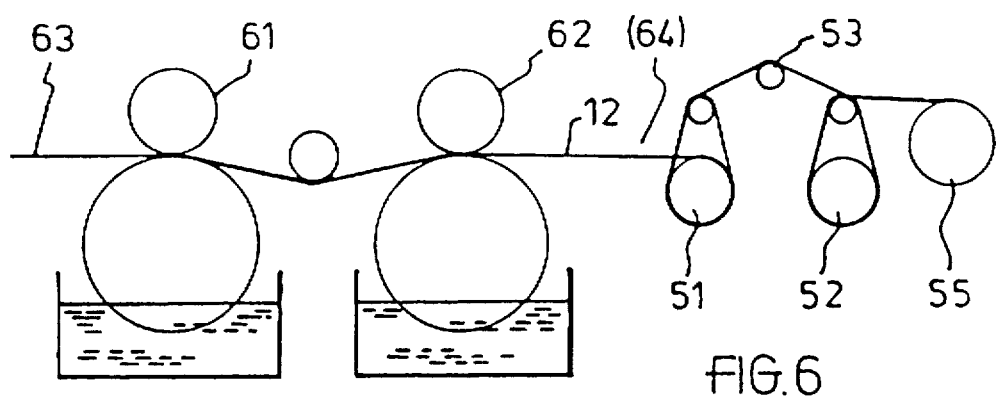
FIG. 6 is a diagrammatic illustration of another arrangement for making strand materials.

The starting laminar material may be produced continuously with the stretching thereof. FIG. 6 illustrates an arrangement comprising first and second coating units 61, 62, which can be adapted to apply polymer coatings on to a feedstock 63 which can, of course, be a tape e.g. of nylon or polyester in undrawn or partially oriented condition or which can be a ribbon of filaments. The coated feedstock 64 passes straight into the draw zone comprising input and output godets 51, 52 and optional draw pin 53, then to wind-up 55.

Figure 9:
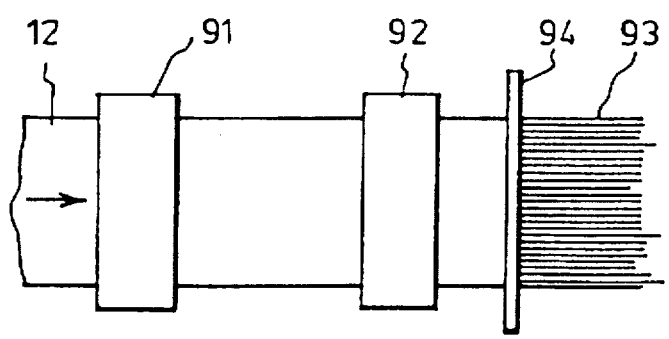
FIG. 9 is a diagrammatic illustration showing the production of strand material by slitting from a sheet.

FIG. 9 illustrates a different procedure for making strand material of the invention comprising drawing between input and output means (for example nip rollers) 91, 92 of a draw zone a wide sheet material 12 of laminar construction having first, drawable and second, elastically extensible layers as aforesaid. The drawn material output from the output means 92 is then slit into multiple narrow tapes 93 by an array 94 of knives, hot wires, jets, lasers or other slitting means and wound up in a wind-up arrangement (not shown). The wind-up arrangement can comprise individual package winding devices for each slit end, or a beam on which all the ends are wound together. The ends will each tend to coil after slitting, unless measures are taken to prevent coiling, but in that event the tendency to coil is maintained through storage in the flat state. The drawn sheet could be wound up as such prior to slitting for storage, being unwound on a subsequent occasion for slitting whereupon, because of the stability brought about by the measures referred to above, according to the invention, the slit ends will again readily coil.

Figure 10:
FIG. 10 is a view of a strand with a reversing helical coil.

FIG. 10 illustrates another coil formation effected according to the invention. Another method for accommodating the strains in the laminar material is to force (as by twisting) the strand material to adopt, after drawing, a different coil configuration, namely a helical configuration instead of the spiral configuration. As a regular helical configuration would imply the presence of real twist, the actual configuration (unless of course, real twist has been inserted) will be that of a reversing helix in which S and Z twisted sections along the length of the strand alternate and balance each other.

The drawable and elastically extendable materials will in general be selected to be compatible and have a high affinity one for the other, so that the various dimensional changes and changes in other physical properties do not adversely affect the integrity of the laminar material and cause the first and second layers to separate.

Strand materials according to the invention can be manufactured to be readily reproducible, are capable of rapid and inexpensive production using inexpensive materials not normally suitable for the production of textile filaments. The strand materials can also be made sufficiently tight as to include in their coils particulates or liquids serving any of a variety of purposes.

Thus, sewing thread may include a lubricant which is normally-held within the coil(s) but which is released when the strand is subject to stress as during high speed machine sewing. Other materials that can be contained are biocides and flame retardants. These substances may be introduced into the coils whilst they are forming in the drawing step, or they may be drawn in, in the case of liquids, by capillary action.

The foregoing disclosure may contain features and combinations of features which are novel and inventive over the prior art and which, while not necessarily falling within the scope of the appended claims, could be independently claimed in this application (as relating to the same invention as covered by the present claims) or in a continuing or divisional application.

We claim:

1. A method for making strand material comprising drawing in a draw direction a laminar material having a first layer of drawable material and a second layer of elastically extensible material so that the first layer extends inelastically so that the drawn material tends to curl about an axis extending in the draw direction into a coiled strand configuration.

2. A method according to claim 1 in which the second layer is of elastomeric material.

3. A method according to claim 1, in which the drawable material is drawn until it is fully drawn.

4. A method according to claim 3, in which the drawable material is overdrawn.

5. A method according to claim 1, in which the laminar material has an associated drawable filament material which is drawn with the said first layer.

6. A method according to claim 5, in which the laminar material has an associated drawable multi-filament yarn which is drawn with said first layer.

7. A method according to claim 5 in which the filament material is coated with a drawable polymer coating to form said first layer.

8. A method according to claim 5, in which the filament material is coated with an elastomeric material to form said second layer.

9. A method according to claim 5, in which the laminar material is produced by coating a layer of material onto a substrate.

10. A method according to claim 1, in which at least one of said first and second layers contains inclusions that modify its behaviour under extension.

11. A method according to claim 10, in which the second layer contains compressible or fluid inclusions.

12. A method according to claim 11, in which the second layer contains incompressible or solid inclusions.

13. A method according to claim 11, in which the compressible of fluid inclusions comprise gas bubbles.

14. A method according to claim 10, in which the second layer contains incompressible or solid inclusions.

15. A method according to claim 14, in which the incompressible or solid inclusions comprise sub-micron size solid particles.

16. A method according to claim 10, in which at least one of said first and second layers has a non-uniform thickness across its width.

17. A method according to claim 10, in which the laminar material is produced by coating a layer of material onto a substrate.

18. A method according to claim 1, in which at least one of said first and second layers has non-uniform thickness across its width.

19. A method according to claim 18, in which at least one of said first and second layers increases in thickness from one edge to the other.

20. A method according to claim 18, in which the laminar material is produced by coating a layer of material onto a substrate.

21. A method according to claim 1, in which the drawing is effected continuously.

22. A method according to claim 21, in which drawing is effected symmetrically with respect to the laminar material so as to give rise to a tendency to coil inwardly from either edge in between input output means defining a draw zone.

23. A method according to claim 21, in which drawing is effected asymmetrically with respect to the laminar material so as to give rise to a tendency to coil inwardly with a single spiral cross-section formation in between input and output means defining a draw zone.

24. A method according to claim 1, in which the laminar material is produced by creating a layer of material on to a substrate.

25. A method according to claim 24, in which the second layer is coated on to a substrate comprising the first layer.

26. A method according to claim 24, in which the first layer is coated on to a substrate comprising the second layer.

27. A method according to claim 1, in which the second layer comprises a composite layer having a first component filled with compressible or fluid or incompressible or solid inclusions or both and a second component with or without such inclusions.

28. A method according to claim 1, in which molecules of the second layer are cross-linked.

29. A method according to claim 1, in which the first and second layers are chemically linked.

30. A method according to claim 1, in which the laminar material comprises a tape.

31. A method according to claim 1 in which the laminar material comprises a film and the method further comprises the step of cutting the film into tapes after drawing.

32. A method according to claim 31, in which the film is cut into tapes continuously with the drawing step.

33. A method according to claim 1, in which the laminar material is made continuously with the drawing step.

34. A method according to claim 1, in which the laminar material is produced by coating a layer of material on to a substrate and the substrate is coated and drawn in a continuous operation.

35. A drawn strand material produced by a method as claimed in claim 1.

36. A strand material according to claim 35, having a particulate or liquid inclusion in the coils of the laminar material.

37. An elongate drawn strand material comprising a laminar material coiled about an axis extending parallel to the length of the drawn strand material into a spiral form cross-section and having first and second layers, the first layer of which is drawn from a drawable material to at least a normal draw ratio, the second layer of which is of a stretched elastomeric material.

38. A strand material according to claim 37, having a cross-section in the form of a letter "C" the ends of which are curled into high spiral form.

39. A strand material according to claim 37, having a single spiral cross-section.

40. A strand material according to claim 37, having a particulate or liquid inclusion in the coils of the laminar material.

* * * * *